US009478319B2

United States Patent
Gregorich et al.

(10) Patent No.: US 9,478,319 B2
(45) Date of Patent: Oct. 25, 2016

(54) METHOD OF OPERATING A POWER GENERATOR BASED ON NOBLE METAL INDUCED OXIDATION OF A HEAT TRANSFER SURFACE

(71) Applicant: AREVA NP Inc., Lynchburg, VA (US)

(72) Inventors: Carola A. Gregorich, Lynchburg, VA (US); John M. Riddle, Forest, VA (US); Mihai G. M. Pop, Alexandria, VA (US)

(73) Assignee: AREVA Inc., Lynchburg, VA (US)

( * ) Notice: Subject to any disclaimer, the term of this patent is extended or adjusted under 35 U.S.C. 154(b) by 557 days.

(21) Appl. No.: 13/751,956

(22) Filed: Jan. 28, 2013

(65) Prior Publication Data

US 2014/0211903 A1    Jul. 31, 2014

(51) Int. Cl.
G21C 19/28 (2006.01)
G21C 17/022 (2006.01)
G21C 15/28 (2006.01)
C23F 15/00 (2006.01)

(52) U.S. Cl.
CPC ........... *G21C 17/0225* (2013.01); *C23F 15/00* (2013.01); *G21C 15/28* (2013.01); *G21Y 2002/103* (2013.01); *Y02E 30/40* (2013.01)

(58) Field of Classification Search
CPC .................. G21C 17/0225; C23F 15/00
USPC ............... 376/245, 305, 306; 422/7
See application file for complete search history.

(56) References Cited

U.S. PATENT DOCUMENTS 5,608,766 A * 3/1997 Andresen et al. .......... 376/306
6,366,083 B1 * 4/2002 McClelland ................ 324/230
6,369,566 B1 * 4/2002 McClelland ................ 376/245
6,440,297 B1 * 8/2002 Kim et al. ................... 376/306
6,895,066 B1 * 5/2005 Busch et al. ............... 376/245
2004/0035835 A1 * 2/2004 Kowdley et al. ........... 376/260
2011/0019790 A1 * 1/2011 Pop et al. ................... 376/245
2013/0010911 A1 * 1/2013 Shin et al. .................. 376/245

OTHER PUBLICATIONS

USPTO, "Jul. 2015 Update: Subject Matter Eligibility".*
Hosokawa et al, "Development of a Suppression Method for Deposition of Radioactive Cobalt after Chemical Decontamination: (I) Effect of the Ferrite Film Coating on Suppression of Cobalt Deposition", Journal of Nuclear Science and Technology, vol. 47, No. 6, p. 531-537 (2010).*
Wood, "Recent Developments in Chemical Decontamination Technology", EPRI, Proceedings of the Third International Workshop on the Implementation of ALARA at Nuclear Power Plants, NUREG/CP-0143, BNL-NUREG-52440, Mar. 1995.*
Mike Pop et al., *Use of the Areva BWR Crud Model to Study High Zinc Operation at a US Plant*, 15th International Conference on Environmental Degradation of Materials in Nuclear Power Systems—Water Reactors, (2011).

(Continued)

*Primary Examiner* — Jack W Keith
*Assistant Examiner* — Daniel Wasil
(74) *Attorney, Agent, or Firm* — Davidson, Davidson & Kappel, LLC

(57) ABSTRACT

A method of operating a power generator is provided. The method includes determining an amount of oxides on a heat transfer surface of the power generator as a function of a concentration of a noble metal substance in the oxides; and altering operation of the power generator when the amount of oxides on the heat transfer surface reaches a predetermined value. A method of operating a nuclear reactor is also provided.

13 Claims, 5 Drawing Sheets

(56) References Cited

OTHER PUBLICATIONS

S. Foley et al., *Radiolysis of Confined Water: Production and Reactivity of Hydroxyl Radicals*, Angew. Chem. 117, (2005), p. 112-114.

S. LeCaer et al., *Hydrogen Peroxide Formation in the Radiolysis of Hydrated Nanoporous Glasses: A Low and High Dose Study*, Chem. Phys. Lett. 450, (2007), 91-95.

Yang, Z. et al., *The adsorption, diffusion and dissociation of 02 on Pt-skin Pt3Ni(1 11): A density functional the my study*, Chemical Physics Letters 499, (2010), p. 83-88.

Gasteiger, H., Mathias, M., *Fundamental Research and Development Challenges in Polymer Electrolyte Fuel Cell Technology*, The Electrochemical Society, (2005), p. 1.

Maghsodi, A. et al., *Exploration of bimetallic Pt—Pd/C nanoparticles as an electrocatalystfor oxygen reduction reaction*, Applied Surface Science 257, (2011), p. 6353-6357.

Sode. A. et al., *Electrochemical Formation of a Pt/Zn Alloy and Its Use as a Catalyst for Oxygen Reduction Reaction in Fuel Cells*, J. Phys. Chem. B, (2006), 110, 8715-8722.

Oezaslan, M., Strasser, P., *Activity of dealloyed PtCo3 and PtCu3 nanoparticle electrocatalyst for oxygen reduction reaction in polymer electrolyte membrane fuel cell*, Journal of Power Sources 196 (2011) 5240-5249.

Fernandez, J.L., Walsh, D.A. Bard, A.J., *Thermodynamic guidelines for the design of bimetallic catalysts for oxygen electroreduction and rapid screening by scanning electrochemical microscopy. M—Co (M• Pd, Ag, Au)*, J. Am. Chem. Soc. 127 (2005) 357-365.

Paul Cohen, *Heat and Mass Transfer for Boiling in Porous Deposits with Chimneys*, AIChe Symposium, vol. 70, Issue 138, (1974), p. 71 to 80.

\* cited by examiner

METHOD OF OPERATING A POWER GENERATOR BASED ON NOBLE METAL INDUCED OXIDATION OF A HEAT TRANSFER SURFACE

The present disclosure relates generally to power generators and more particularly to nuclear reactors.

BACKGROUND

Power generators, including nuclear reactors, are used for power generation, research and propulsion. A power generation circuit generally includes a heat source such as a nuclear core or furnace and a coolant circuit. Respective coolant piping circuits transport the heated water or steam to either a steam generator and then a turbine, or directly to a turbine, and after going through a condenser (heat sink), carries circulating or feedwater back to the heating source. Operating temperatures and pressure may range up to or above the critical point of water. Depending on the operational conditions, the various materials used must withstand the various load, environmental and radiation conditions.

Material used as coolant piping and other circuit and heat source components include but are not limited to carbon steel, stainless steels, nickel-based and other alloy steels and zirconium based alloys. These materials have to withstand the high temperature and high pressure condition. Although the materials have been carefully selected, corrosion occurs caused by the corrosive nature of high temperature, high pressure water, water radiolysis, and radiation effects. Such corrosion processes limit the lifetime of the boiling systems, and included but are not limited to stress corrosion cracking, flow accelerated corrosion, crevice corrosion and erosion corrosion.

Stress corrosion cracking (SCC), including intergranular stress corrosion cracking (IGSCC), is a well-known phenomenon happening to structural components in boiler coolant circuits, which affects the base and welding materials. SCC occurs through crack initiation, and propagation, which are caused by a combination of chemical, tensile and ductile stresses (static and dynamic). Such stresses are common in boiling environments caused by thermal expansion and contraction, residual stresses from welding, cold working, etc. The susceptibility toward SCC is often increased by the operating coolant environment, welding, heat treatment, radiolysis and radiation.

High oxygen content in the coolant has been shown to accelerate SCC through higher rates of crack initiation and propagation. High oxygen content in the coolant can stem from oxygen intrusion and water radiolysis processes, which create highly oxidizing species such as oxygen radical, hydrogen peroxide and many other radical species in the gamma, neutron, beta, and alpha flux.

The electrochemical potential (ECP) is a measure for the thermodynamic probability for corrosion to occur. The ECP is commonly employed to determine the rate of corrosion processes such as SCC, fatigue, film thickening and general corrosion. The ECP is directly proportional to the presence of oxidizing species such as oxygen, hydrogen peroxide, and any oxygen-containing radicals produced in the radiolytic decomposition of the boiling fluid and its additives.

The protection of unheated metal surfaces of nuclear reactors, which may be formed of steel and include boiler internals and piping of boiler systems, has been proved to be achieved at ECPs below −230 mV based on the standard hydrogen electrode (SHE) scale. The ECP in common water-cooled boiler systems is well above this threshold. As described for example in U.S. Pat. No. 6,793,883 and U.S. Pub. No. 2002/0118787, noble metals may be injected at varying intervals and concentrations to lower the ECP in boiler systems. The injection of noble metals may scavenge oxygen or oxygen radicals from the coolant and/or shift the water radiolytic decomposition equilibrium toward the recombination to water by catalysis.

The injection of noble metals may result in surface localized lowering of the ECP at unheated metal surfaces of nuclear reactors. The noble metals, which are injected as solution into the coolant, form partial or complete colloids or particulates under temperature, high pressure and radiation conditions. Thermal forces and electrostatic attraction of colloidal particles is the driving force for the deposition of the noble metal particles and colloids onto the coolant circuit surfaces to be protected and onto the surface of the heat source, i.e., a heat transfer surface, such as the cladding materials of nuclear fuel. The ECP of the surfaces is effectively lowered to below −230 mV caused by the noble metals catalyzed recombination reaction to water, which reduces the oxidizing species in the vicinity of the surfaces.

Boiling Water Reactors (BWRs), a subclass of water-moderated nuclear reactors, have employed noble metals injection for reactor internals stress corrosion cracking mitigation at unheated metal surfaces. In noble metal injection and application processes, dissolved noble metal (for example rhodium, platinum) solutions are injected into the reactor water systems.

The quantity of noble metals in coolant is high during the injections and decreases between injections. Noble metals not deposited on coolant circuit or heat source surfaces are typically removed by the coolant cleanup system. Different noble metal injection approaches have been developed, from once every two to three cycles, over annual injections, i.e. two injections per 24-month cycle of reactor operation (one at the beginning of the cycle, i.e. after 90 days, and another injections about 12 month after the first injection), to mini injections. Mini injections, i.e., about ¹/₁₀th of the typical annual injection rate, are injected on a monthly basis following an initial injection of about half the annual injection rate.

Corrosion products present in the coolant ultimately accumulate on the heat transfer surface, for instance on fuel element surfaces formed of zirconium, forming what is commonly called crud. The crud has a layer of low density loose crud, harboring mostly water, which is in constant exchange with the circulating reactor water, but providing a metal oxide structure capable of attracting and retaining colloidal particulates. This layer of low density loose crud is called fluffy crud. Below the layer of fluffy crud, closer to the heat transfer surface, a layer of higher density crud exists, called tenacious crud. The tenacious crud forms on a metal oxide layer of the heat transfer surface, which forms on heat transfer surface due to heating of heat transfer surface (i.e., general corrosion). For example, on fuel element surfaces formed of zirconium, heating results in the formation of a zirconium oxide layer. The fraction of tenacious crud increases as crud deposition increases and the crud ages. The densification is accelerated by excessive heat and prolonged exposure.

Noble metals have been detected and measured in crud deposits, even several cycles after the initial noble metals injections (in the case of injecting noble metals once every two to three cycles). The prolonged presence of noble metals in the crud deposits indicates that the noble metals are likely present in metallic particulate form, and are susceptible to redistribution throughout the reactor coolant system when the noble metals are present in the fluffy layer of the crud deposit. Noble metal particulates have also been identified in the tenacious crud fraction, close to the zirconium oxide layer of the element, which is generally a fuel rod or pin.

The sponge-like nature of the crud layer creates conditions corresponding to capillary water movement. The very low capillary velocities of fluids in crud, creating almost confined conditions, favor the water radiolysis reactions that form the molecular species, i.e. hydrogen, oxygen, hydrogen peroxide and the HO radical. Studies have shown that the hydrogen in confined spaces is ineffective in facilitating the recombination reaction to water. Hence, in confined spaces the sum of the oxidizing species, i.e. oxygen, hydrogen peroxide and oxygen radical, effectively create an oxygen saturated environment.

Metallic platinum and other noble metals are known to be electrochemical catalysts for both anodic hydrogen oxidation reaction (HOR) and cathodic oxygen reduction reaction (ORR). ORR rates are typically several orders of magnitude lower than the HOR rate. Platinum, however, when compared to other transition metals, has the highest ORR activity. Platinum alloys (PtNi, PtCr, PtFe, PtCo) have been shown to exhibit enhanced ORR activities compared to platinum alone.

Nano-sized platinum metallic particles have been shown to have an even higher catalytic activity when compared to smooth metallic surfaces, resulting from the available surface-to-mass ratio and crystallographic orientations. Furthermore, alloying platinum with transition metals has been shown to "extend" or enhance the catalytic properties. Studies have demonstrated that colloidal alloys of platinum with transition metals (V, Cr, Co, Ti, Ni, Zn) exhibit significantly higher electrocatalytic activities toward ORR than platinum alone. Dealloyed $PtCu_3$ nanoparticles, for instance, have a higher catalytic activity than dealloyed $PtCo_3$. This increase in catalytic activity toward the ORR has been explained by the ability of colloidal alloys of platinum with transition metals to break the O—O bond of $O_2$ and to reduce the adsorbed atomic oxygen.

SUMMARY OF THE INVENTION

A method of operating a power generator is provided. The method includes determining an amount of oxides on a heat transfer surface of the power generator as a function of a concentration of a noble metal substance in the oxides; and altering operation of the power generator when the amount of oxides on the heat transfer surface reaches a predetermined value.

A method of operating a nuclear reactor is also provided. The method includes injecting a noble metal substance into the nuclear reactor; and determining an amount of oxides on a nuclear fuel element surface of the nuclear reactor as a function of a concentration of a noble metal substance in the oxides on the nuclear fuel element surface.

BRIEF DESCRIPTION OF THE DRAWINGS

The present invention is described below by reference to the following drawings, in which.

DETAILED DESCRIPTION

Figure 1:
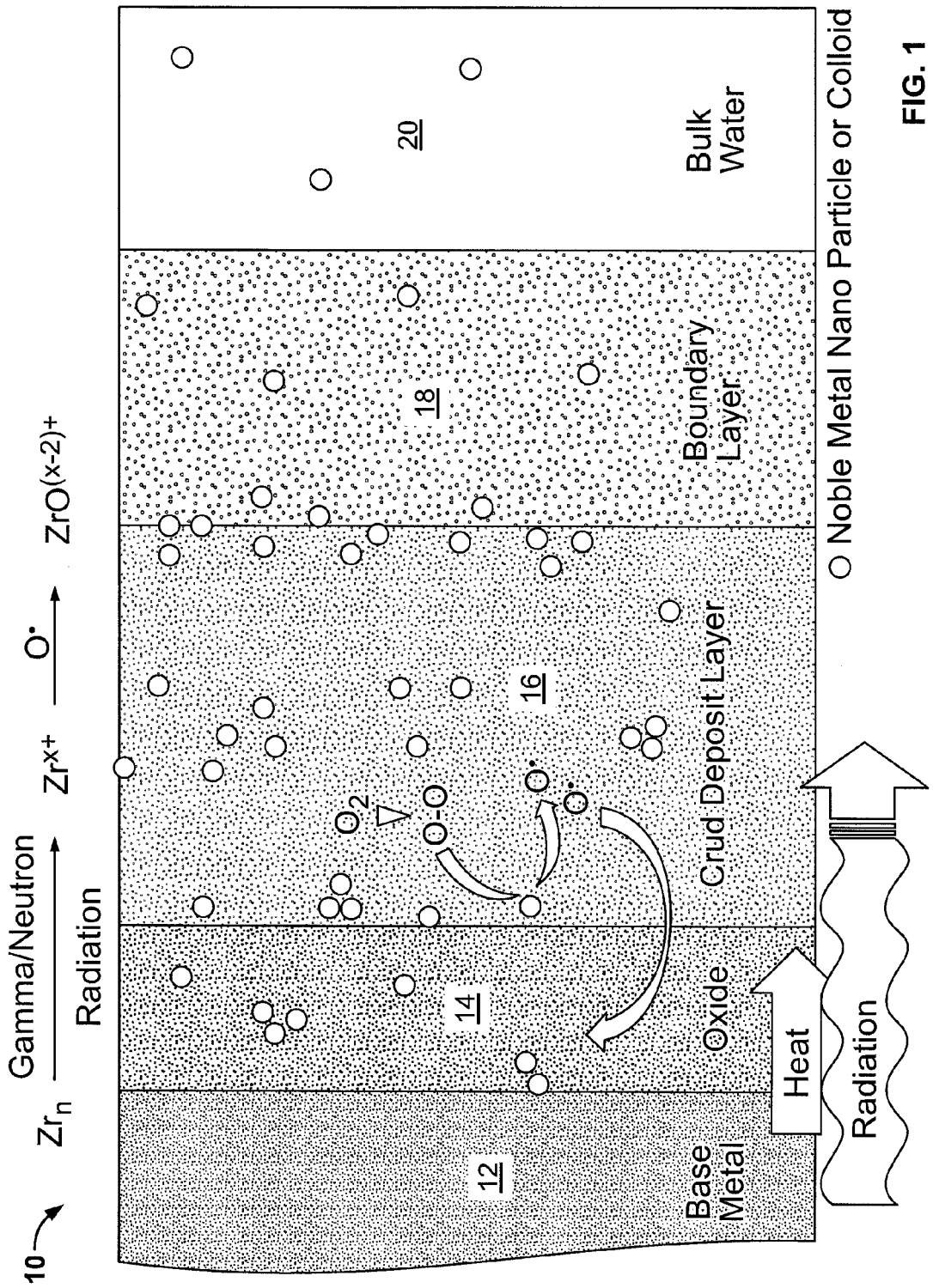
FIG. 1 schematically shows a heat transfer surface showing catalysis by noble metals colloids wedged into a crud layer sponge matrix of oxygen reduction reactions and a subsequent base metal oxidation process.

Embodiments of the present invention include determining the corrosion of a heat transfer surface in a power generator, particularly a high pressure water-cooled boiler system, for example a nuclear reactor, caused by the catalysis of noble metals deposited directly on the cladding material, the material's oxide, and/or crud layer superimposed on the material's oxide. The high pressure water-cooled boiler systems may include any electric power generator station employing high pressure high temperature water cooling circuits, including, but not limited to light water reactors, boiling water reactors, pressurized water reactors, heavy water reactors, gas and coal-fired generating stations and water cooled solar generating stations. The heat transfer surface may be formed of, for example, zirconium, zirconium alloys, stainless steel, titanium, titanium alloys or nickel based alloys and may be, for example, the surface of nuclear fuel element cladding, steam generator tubing, furnace boiler tubing or heat exchanger tubing. Input parameters for such a calculation may be the cladding material oxidation layer thickness caused by the metal oxide layer formed on the heated metal surface (i.e., oxide caused by general corrosion), the crud layer thickness and morphology, and the noble metal injection data (amount and timing) as well as coolant noble metal concentration data as function of time.

Embodiments of the invention may relate an amount of noble metals injected into the reactor to a coverage of the noble metals on a heat transfer surfaces such as that of fuel cladding in the reactor (i.e. zirconium, zirconium oxide, and/or crud deposition surfaces) as function of noble metal injection fuel cladding coverage target, reload batch, and axial height. A concentration of the noble metals on the heat transfer surfaces, such as a fuel cladding surface, controls an oxidation rate of the cladding material. An oxidation rate induced by the noble metal may be a composite of different processes within the power generator, which are caused by noble metals dissolved into the reactor water, noble metal nanoparticles and noble metals colloids present in the coolant, as well as interactions with the dissolved noble metals, the noble metal nanoparticles and the noble metal colloids and diffusion processes within the oxide layer and crud deposit matrices.

Embodiments of the invention may provide the noble metal concentration in the outer fluffy crud layer, the noble metal concentration in the inner tenacious/oxide crud layer and the thickness of the oxide layer. The noble metal concentrations may be provided as a function of operating time and location. The uncertainty of this calculation may be estimated to be approximately 10% based on the above-mentioned input parameters.

Embodiments of the invention may enable the assessment and prediction of the noble metals-induced corrosion of heat source cladding material, such as zirconium and its alloys, particularly under such adverse chemical conditions as encountered in the high temperature, high pressure coolants of boiler systems. As such, the results of these embodiments enable the preventative protection of the heat source from adverse coolant conditions and the introduction of mitigating actions when deemed necessary. The mitigating actions may include cleaning the heat transfer surface and/or adjusting the injection of noble metals to balance the general corrosion with the noble metal induced corrosion.

As used herein, the term "noble metal substance" refers to all metal catalysts including, for example, platinum, rhodium, gold, palladium, silver, iridium, ruthenium, osmium, rhenium, combinations of two or more noble metals, alloys of noble metals with transition metals including, for example, cobalt, iron, nickel, chromium and chemical solutions of noble metals with various soluble compounds, including, for example, acetates, acetyl acetonates, hexahydroxy acids, oxy-hydrate, nitrates, nitrites, oxides, phosphates, and sulfates. The noble metal substance may be in solution, as particles, as colloids, as colloid particles or any combination thereof.

As used herein, "platinum injection technology" refers to any type of noble metals application, including for example plating, sputtering and wet deposition, employed to any heat transfer surface. Heat transfer surfaces may for example be formed of zirconium, zirconium alloys and nickel-based alloys.

As used herein, "platinum target injection value" refers to a specific number calculated by the vendor providing the platinum injection technology and is given in $\mu g/cm^2$. The platinum target injection value is typically calculated by the vendor based on a heated surface area, a cleanup rate of a coolant cleanup unit, an observed coolant platinum concentration and an amount of platinum injected.

Embodiments of the present invention may include calculating the effect of noble metals on boiler-coolant systems other than nuclear reactors. The boiler-coolant systems may include any, clean or oxidized, metallic heat transfer surface covered with noble metal by any method and to any extent, density, or concentration.

Embodiments of the present invention may include calculating the oxidative effect of noble metals, for example platinum, on cladding material of heat transfer surfaces. The calculation may consider the noble metals-enhanced oxidation rate of the cladding material as a combined effect of noble metal substance deposited directly on the surface of the heat transfer material and of noble metal substance incorporated in the crud deposit layer that accumulated on the heat transfer surfaces during boiler operation.

Embodiments of the present invention may correlate the injected noble metal substance amount to the noble metal substance coverage on the heat transfer surfaces and to the crud deposition thickness at a given moment in time and location of the heat transfer surface.

Embodiments of the present invention may differentiate between noble metal substance nanoparticles/colloids deposition characteristics, interaction, and catalysis at the surface of the cladding oxide (surface of heat transfer surface material that is oxidized during operation) and that of noble metal substance deposited in the crud deposit matrices. The processes are treated separately but are interfaced, i.e. the crud deposit feeds the oxide surface with platinum of other noble metal substance.

FIG. 1 shows an example of a heat transfer surface 10. FIG. 1 is a schematic of the catalysis by noble metals colloids wedged into the crud's sponge matrix of the ORR and the subsequent base metal oxidation process. The heat transfer surface 10 includes a base metal 12 upon which an oxide layer 14 has formed by general corrosion—oxygen in the coolant of the power generator reacts with the metal base layer 12 of heat transfer surface 10 to form the oxide layer 14 which partially dissolves in the base layer 12 embrittling and weakening the base layer 12. In this example, base metal 12 is formed of zirconium and oxide layer 14 is zirconium oxide. A crud deposit layer 16, which is formed of a tenacious crud layer adjacent to oxide layer 14 and a fluffy crud layer on top of the tenacious crud layer, has been deposited on oxide layer 14. Crud deposit layer 16 is formed of corrosion products present in coolant being circulated to absorb on heat transfer surface 10. A boundary layer 18 is present between the outer surface of crud deposit layer 16 and bulk coolant 20, which in this embodiment is water. As shown in FIG. 1, noble metal nanoparticles or colloids 22 injected into bulk coolant 20 are dispersed throughout oxide layer 14 and crud deposit layer 16. FIG. 1 is a schematic of the catalysis of the ORR by noble metal nanoparticles or colloids 22 wedged into a sponge matrix of crud deposit layer 16 and the subsequent base metal oxidation process.

Figure 2:
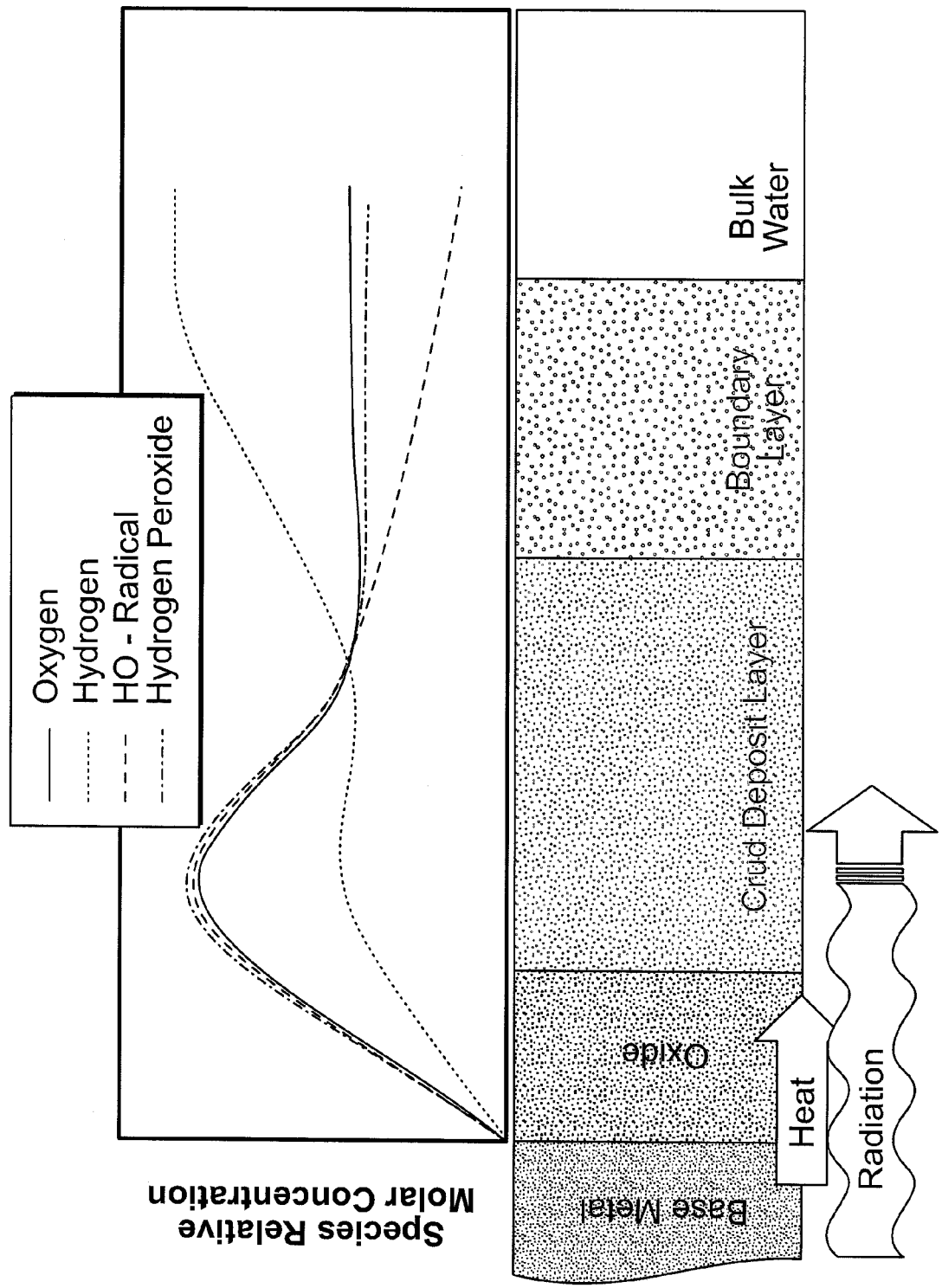
FIG. 2 schematically shows the evolution of molar concentration of molecular species created by water radiolysis on the heat transfer surface shown in FIG. 1.

FIG. 2 schematically shows the evolution of the molar concentration of the molecular species created by water radiolysis on heat transfer surface 10 shown in FIG. 1 as function of oxide layer 14, crud layer 16 and boundary layer 18. The molecular species shown are oxygen, hydrogen, HO radical and hydrogen peroxide. The presence of oxygen enables the noble metals catalyzed ORR, which causes increased corrosion of heat transfer surface 10. The shown molar concentrations may vary depending on specific conditions.

Figure 3:
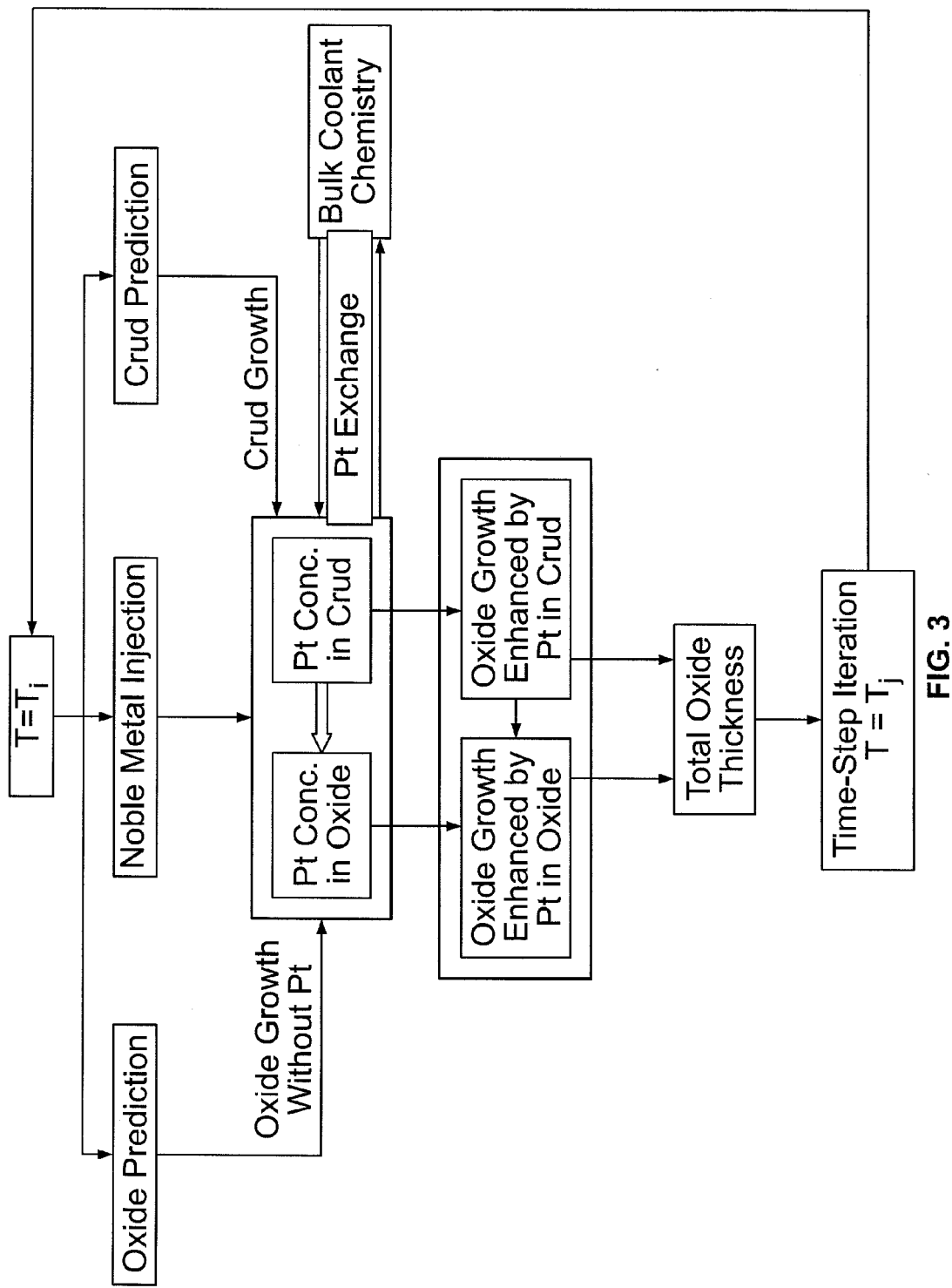
FIG. 3 shows a general flow chart illustrating a method according to a preferred embodiment of the present invention.

FIG. 3 shows a general flow chart illustrating a method according to a preferred embodiment of the present invention. At a time $T=T_i$, a noble metal substance, for example platinum, is injected into a bulk coolant in a cooling circuit of a power generator. At the time of injection, and a time period shortly thereafter, an oxide growth on a heat transfer surface is predicted for both an oxide layer that forms on directly at the heat transfer surface caused by general corrosion, which is not caused by the noble metal substance injection, and a crud layer that grows on the heat transfer surface caused by the dispersing and deposition of corrosion products removed from non-heated surfaces possibly aggravated by the injection of noble metal substance. The injection results in noble metal substance exchange between the bulk coolant and the crud layer, which results in noble metal substance being trapped in the crud layer and transfer of noble metal substance through the crud layer into microfractures formed in the oxide layer of the heat transfer surface. These noble metal substance deposits enhance oxide growth at both the oxide layer and the crud. Thus, the oxide growth over time may be iteratively calculated as a function of the concentration of the noble metal substance in the oxide layer and the concentration of the noble metal substance in the crud layer.

Figure 4:
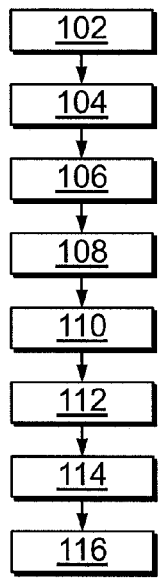
FIG. 4 shows a method according to a preferred embodiment of the present invention.

FIG. 4 shows a method according to a preferred embodiment of the present invention. For ease of reference, this embodiment is discussed with respect to platinum only; however, it can be applicable to any noble metal or combination of noble metals. A first step 102 in this embodiment is calculating a maximum peak platinum loading $c_{Pt}^P$ on the heat transfer surface following a platinum injection. In a nuclear reactor, the maximum platinum loading on the heat transfer surface occurs at the hottest nuclear fuel element in the nuclear reactor core. The maximum peak platinum loading is a numerical value that may be calculated using available plant data and a platinum target injection loading value for example using the following polynomial relationship:

$$c_{Pt}^P = A(c_{Pt}^I)^2 + B(cp_{Pt}^I) - C \quad (1)$$

where:

$c_{Pt}^P$ is the maximum peak platinum loading on heat transfer surfaces upon injection, μg/cm²;

$c_{Pt}^I$ is the platinum target injection loading on non-heated surfaces, μg/cm²; and A, B and C are the equation's coefficients.

A second step 104 in the embodiment shown in FIG. 4 is determining an axial distribution of platinum on the maximum loaded heat transfer surface. In a nuclear reactor, step 104 involves determining the axial distribution of platinum on the nuclear fuel element. Based on existing plant data a correction factor $f_H$ may be determined to be applied to the calculation of the platinum loading at a given height of the heat transfer surface based on the maximum peak platinum loading on heat transfers surface computed by equation (1). Height of the heat transfer surface refers herein to the distance of the first point on coolant contact with the heated surface to the $n^{th}$ point of contact. The correction factor may be calculated for example using the following polynomial equation:

$$f_H = D_H^3 - E_H^2 + F_H - G \quad (2)$$

where:

$f_H$ is the correction factor, adjusting maximum platinum loading on the heat transfer surface upon injection, μg/cm² to the platinum loading at the considered height;

H is the height designation of heat transfer surface; and

D, E, F and G are coefficients of the equation, varying for each height designation H.

The correction factor $f_H$ is determined for each height H. The height with the greatest correction factor is then determined to be the hottest point of the hottest fuel element. The value for maximum peak platinum loading $c_{Pt}^P$ from equation (1) is then multiplied by the greatest correction factor $f_H$ to determine the maximum peak platinum loading $c_{Pt}^P$ for the specified height of the heat transfer surface.

A third step 106 is determining an initial distribution of the maximum peak platinum loading along the heights of the heat transfer surfaces. The initial distribution may be calculated according to equation (3) from available plant data. The initial distribution of the maximum peak platinum loading on heat transfer surfaces is such that the majority of platinum injected resides within the crud deposit layer, while only a very small fraction reaches directly the oxide layer of the heat transfer material, assuming that sufficient time for general corrosion of the heat transfer surface has been allowed prior to platinum injection. In a nuclear reactor, step 106 involves determining the axial distribution of platinum on the nuclear fuel element to determine the point of the hottest fuel element that has the most platinum loading (i.e., the hottest point of the hottest fuel element). Accordingly, the total maximum peak platinum on heat transfer surfaces is calculated as the sum of the platinum captured in the crud layer and the platinum captured in the oxide layer of the heat transfer surfaces for example according to the following equation:

$$c_{Pt}^P = c_{Pt}^{Poxide} + c_{Pt}^{Pcrud} \quad (3)$$

where:

$c_{Pt}^P$ is the maximum peak platinum loading on heat transfer surfaces upon injection, μg/cm²;

$c_{Pt}^{Poxide}$ is the maximum peak platinum loading on heat transfer surfaces upon injection going directly to the oxide, μg/cm²; and $c_{Pt}^{Pcrud}$ is the maximum peak platinum loading on fuel cladding upon injection going directly into crud on top of the fuel oxide, μg/cm².

Based on plant observations regarding the ratio of platinum distribution in the oxide layer and platinum distribution in the crud layer, the maximum peak platinum loading $c_{Pt}^P$ is then used to calculate the maximum peak platinum loading on heat transfer surfaces upon injection going directly to the oxide $c_{Pt}^{Poxide}$ and the maximum peak platinum loading on fuel cladding upon injection going directly into crud on top of the fuel oxide $c_{Pt}^{Pcrud}$.

Steps 108, 110, 112, 114 of the embodiment shown in FIG. 4 are iteratively executed, which enables the calculation of the oxide thickness caused by the platinum-induced enhanced corrosion as a function of corrosion time. The time interval may be of any chosen time unit.

Step 108 is determining the oxide thickness caused by the platinum catalysis during a first time period, i.e., the initial injection time period, which may be for example 30 days following an injection of platinum into a nuclear reactor for a monthly injection cycle or may be for example 365 days following an injection of platinum into a nuclear reactor for a yearly injection cycle. A polynomial equation (4) may be used to determine platinum deposited directly on or within the oxide layer $d^O_{corr}$ (i.e., a non-pre-oxidized heat transfer surface) without a crud layer and a polynomial equation (5) may be used to determine platinum captured in crud layer deposits $d^C_{corr}$. Both equations (4) and (5) may use empirical plant data. In alternative embodiments, equations (4) and (5) may include different polynomial or exponential functions. An equation (6) may be used to calculate the sum of the oxide thicknesses caused by the platinum entrapped in the oxide (equation (4)) and in the crud (equation (5)), representing the total oxide thickness $d^C_{ox}$, i.e. the oxide thickness caused by general corrosion and platinum-induced corrosion processes. The values may be calculated for example by the following equations:

$$d^O_{corr} = d^G_{ox} + f_{Zr}(Hd^G_{ox} + Jm_{Pt}^3 - Km_{Pt}^2 Lm_{Pt}) \quad (4)$$

$$d^C_{corr} = d^G_{ox} + Hd^G_{ox} + Jm_{Pt}^3 - Km_{Pt}^2 + Lm_{Pt} \quad (5)$$

$$d^E_{ox} = d^O_{corr} + d^C_{corr} \quad (6)$$

where:

$d^O_{corr}$ is the oxide thickness in microns caused by platinum in or on the oxide;

$d^C_{corr}$ is the oxide thickness in microns caused by in the crud deposit layer;

$d^G_{ox}$ is the oxide thickness in micron conventionally predicted for the general corrosion of the heat transfer material;

$d^E_{ox}$ is the oxide thickness in micron resulting from the platinum-induced enhanced corrosion of the heat transfer material;

$m_{Pt}$ is the platinum surface concentration in μg/cm²;

$f_{Zr}$ is the correction factor accounting for the lower oxygen dissociation rate of zirconium oxide; and J, K, and L are coefficients.

To arrive at an initial oxide thickness $d^O_{corr1}$ occurring during the first time period, $m_{Pt}$ in equation (4) $m_{Pt}$ is replaced by $c_{Pt}^{Poxide}$ and to arrive at the initial oxide thickness $d^C_{corr1}$ occurring during the first time period, in equation (5) $m_{Pt}$ is replaced by $C_{Pt}^{Pcrud}$ (see explanation below equation (3)). Accordingly, these thicknesses would be calculated according to the below equations:

$$d^O_{corr1} = d^G_{ox} + f_{Zr}(Hd^G_{ox} + J(c_{Pt}^{Poxide})^3 - K(c_{Pt}^{Poxide})^2 + Lc_{Pt}^{Poxide}) \quad (7)$$

$$d^C_{corr1} = d^G_{ox} + Hd^G_{ox} + J(c_{Pt}^{Pcrud})^3 - K(c_{Pt}^{Pcrud})^2 + Lc_{Pt}^{Pcrud} \quad (8)$$

For the rest of the moments in time following the platinum injection, the evolution of the oxide thickness caused by the influence of platinum located in the crud layer, $m_{Pt}$ in equation (5) is to be substituted with $c_{Pt}^{Cx}$ derived from equation (9), and the evolution of the oxide thickness caused by the influence of platinum directly on/or in the oxide, $m_{Pt}$ in equation (4) is to be substitute with $c_{Pt}^{Ox}$ derived from equation (10).

Other forms of correlations (for example linear or logarithmic) between oxide thickness and platinum concentration in oxide and/or crud layers on base metal of the heat transfer surfaces may be used to represent the enhanced corrosion induced by the platinum.

Step 110 is determining the platinum concentration in the crud layer $c_{Pt}^{Cx}$ during a second time period following the first time period, i.e., the initial injection time period, in which equation (3) is used to determine $c_{Pt}^{Pcrud}$. The platinum concentration in the crud deposit layer is considered to be continuously released from the moment of the initial platinum injection until the next platinum injection. Equation (9) presents a linear release rate. Other release modes may be considered. The release constant M in the equation (9) is determined based on empirical data of flow erosion losses or coolant cleanup efficiency. The release constant M results in a time-interval dependent platinum loss that can be measured to verify the platinum crud release rates. The platinum concentration in the crud layer may be calculated using the following equation:

$$c_{Pt}^{Cx} = Mc_{Pt}^{C(x-1)} \quad (9)$$

where:

$c_{Pt}^{Cx}$ is the platinum concentration in μg/cm² in the crud layer at the given time; and $c_{Pt}^{C(x-1)}$ is the platinum concentration in μg/cm² in the crud layer at the prior time interval to the given time.

At the initial time, i.e. immediately after the platinum injection, $c_{Pt}^{Cx}$ is equal to $c_{Pt}^{Pcrud}$ as presented in equation (3).

Step 112 is determining the platinum concentration in the oxide layer $c_{Pt}^{Ox}$ of the heat transfer surface material during the second time period. For example, if the first time period is 30 days following the initial injection, the second period begins on the 31st day and if the first time period is 365 days following the initial injection, the second time period begins on the 366$^{th}$ day. The platinum concentration in the oxide, as function of time, follows an exponential growth relationship in step 112. The relationship is also a function of the axial height of the heat transfer surface, which is explained with respect to equation (2). The platinum concentration in the oxide layer may be calculated using the following equation:

$$c_{Pt}^{Ox} = c_{Pt}^{O-BOC} e^{(g \cdot dt)} \quad (10)$$

where:

$c_{Pt}^{Ox}$ is the platinum concentration in the oxide at given time and axial height;

$c_{Pt}^{O-BOC}$ is the platinum concentration at the oxide at the beginning of cycle (BOC) (or date of noble metal injection) and the given axial height;

e is the mathematical constant Euler's number;

g is the coefficient for platinum incorporation into the oxide; and dt is the elapsed time since BOC (or date of noble metal injection).

At the initial time, i.e. immediately after the platinum injection, the $c_{Pt}^{Ox}$ is equal to $c_{Pt}^{Poxide}$ as presented in equation (3).

Step 114 is determining the oxide thickness caused by the platinum catalysis during the second time period. Accordingly, as mentioned above, to arrive at a non-initial oxide thickness $d^O_{corr2}$ occurring during the second time period, $m_{Pt}$ in equation (4) is replaced by $c_{Pt}^{Ox}$, and to arrive at the non-initial oxide thickness $d^C_{corr2}$ occurring during the second time period, $m_{Pt}$ in equation (5) is replaced by $c_{Pt}^{Cx}$. These thicknesses would be calculated according to the below equations:

$$d^O_{corr2} = d^G_{ox} + f_{Zr}(Hd^G_{ox} + J(c_{Pt}^{Ox})^3 - K(c_{Pt}^{Ox})^2 + Lc_{Pt}^{Ox}) \quad (11)$$

$$d^C_{corr2} = d^G_{ox} + Hd^G_{ox} + J(c_{Pt}^{Cx})^3 - K(c_{Pt}^{Cx})^2 + Lc_{Pt}^{Cx} \quad (12)$$

In order for the power generator to be safely operated, the total thickness of oxides $d^E_{ox}$ on the heat transfer surface are kept below a predetermined value. Once total thickness of oxides $d^E_{ox}$ on the heat transfer surface reaches the predetermined value, at a step 116, operation of the power generator is altered, either automatically by a computer system programmed to monitor and control the power generator in accordance with the above steps or by an operator of the power generator. In some instances, altering the operation of the power generator may include stopping operation of the power generator and then replacing the heat transfer surface. For example, in a nuclear reactor, once the total thickness of oxides $d^E_{ox}$ on a hottest point of a hottest nuclear fuel element reaches the predetermined value, the nuclear reactor is stopped, the fuel elements are removed from the nuclear reactor and replacement fuel elements are inserted into the nuclear reactor. The nuclear reactor may be restarted with the replacement fuel elements.

In other instances, altering the operation of the power generator may include operating the power generator in a high risk mode. Once the buildup of oxides on the heat transfer reaches a total thickness of oxides $d^E_{ox}$ equal to or greater than the predetermined value, the operability of the reactor may be compromised and a region of the boundary of the heat transfer surface may be at a high risk of failure. In such situations, it may be possible to suppress operation of the region of the heat transfer surface having a high risk of failure. For example, in a nuclear reactor, once the total thickness of oxides $d^E_{ox}$ on a hottest point of a hottest nuclear fuel element reaches the predetermined value, the boundary of the hottest nuclear fuel element may be at a high risk of failure (i.e., the cladding has a high risk of breaking) and the nuclear reactor may be operated in a high risk mode. The hottest nuclear fuel element may then be suppressed by limiting power generator in the hottest nuclear fuel element and optionally nuclear fuel elements surround the hottest nuclear fuel element.

Figure 5:
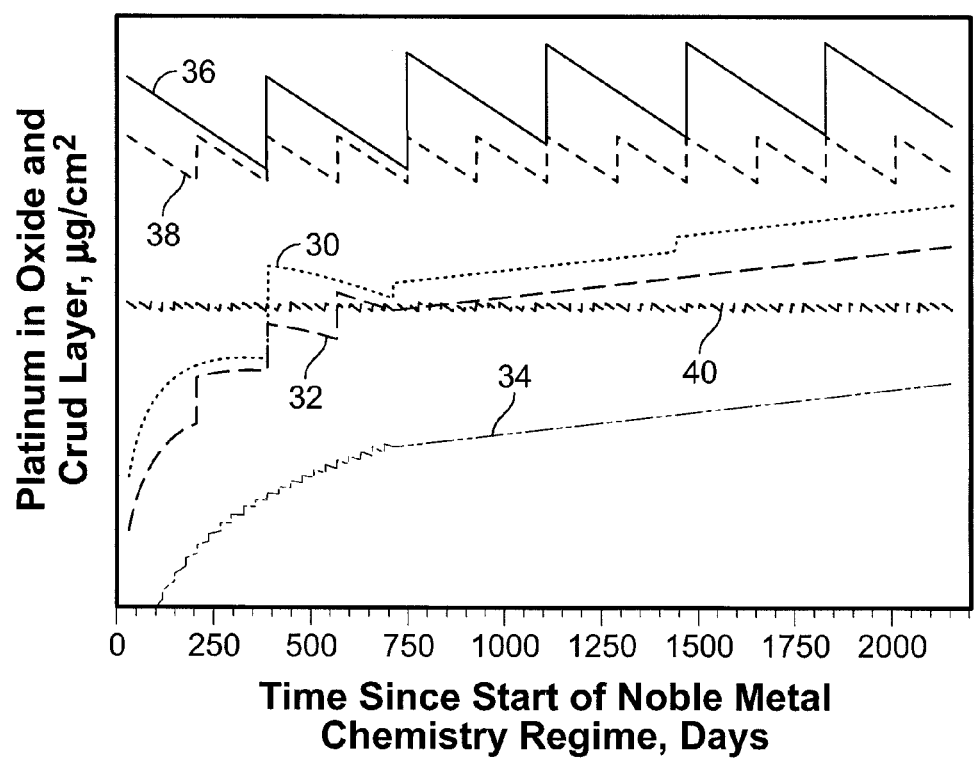
FIG. 5 shows a graph illustrating, as an example, noble metals accumulation and depletion cycles in the oxide layer matrix and the crud layer matrix (logarithmic scale) in response to three noble metals injection schemes.

FIG. 5 shows a graph illustrating, as an example, noble metals accumulation and depletion cycles in the oxide layer matrix and the crud layer matrix (logarithmic scale) in response to three noble metals injection schemes. The graph plots platinum in the oxide and crud layers in µg/cm² versus operating times in days since the initial platinum injection. A line 30 represents the platinum concentration in the oxide layer resulting from annual injections of platinum, a line 32 represents the platinum concentration in the oxide layer resulting from semi-annual injections of platinum and a line 34 represents the platinum concentration in the oxide layer resulting from monthly injections of platinum. A line 36 represents the platinum concentration in the crud layer resulting from annual injections of platinum, a line 38 represents the platinum concentration in the crud layer resulting from semi-annual injections of platinum and a line 40 represents the platinum concentration in the crud layer resulting from monthly injections of platinum.

Figure 6:
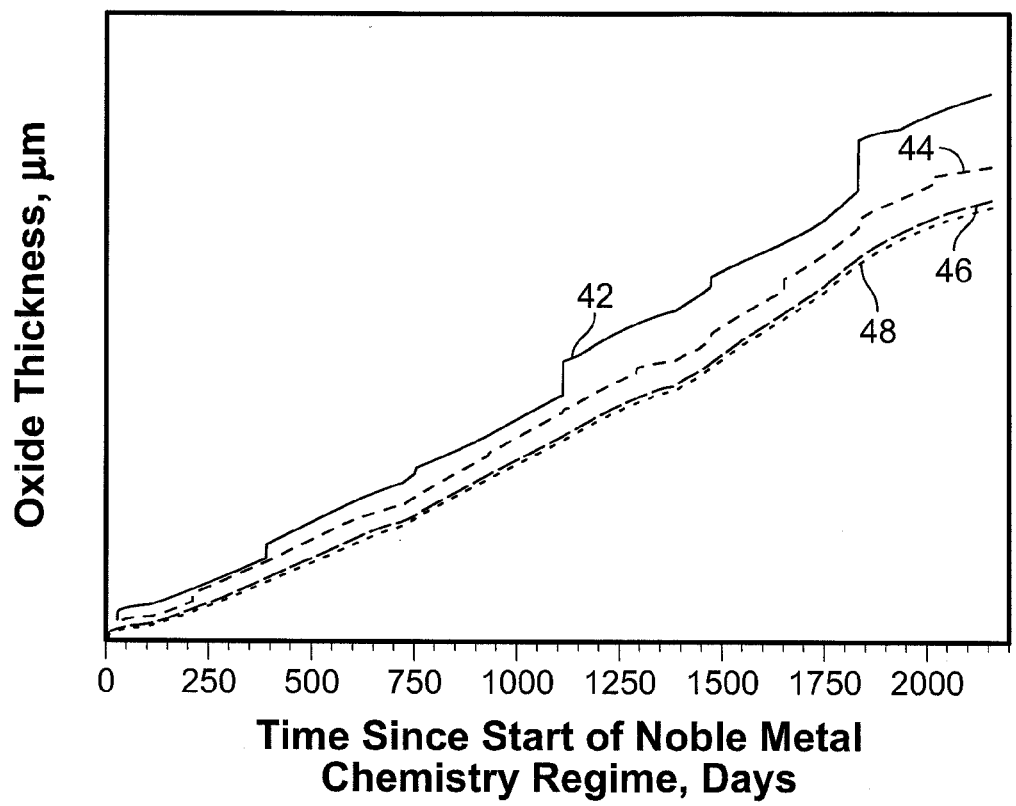
FIG. 6 shows a graph illustrating, as an example, the increase in the oxide layer thickness on a heat transfer surface in response to three different noble metal injection schemes and a situation where no noble metals were injected.

FIG. 6 shows a graph illustrating, as an example, the increase in the oxide layer thickness on a heat transfer surface in response to three different noble metal injection schemes and a situation where no noble metals were injected. The graph plots platinum in the oxide thickness in µg/cm² versus times in days since the initial platinum injection. A line 42 represents the oxide thickness resulting from annual injections of platinum, a line 44 represents the oxide thickness resulting from semi-annual injections of platinum, a line 46 represents the oxide thickness resulting from monthly injections of platinum and a line 48 represents the oxide thickness resulting from no injections of platinum.

Figure 7:
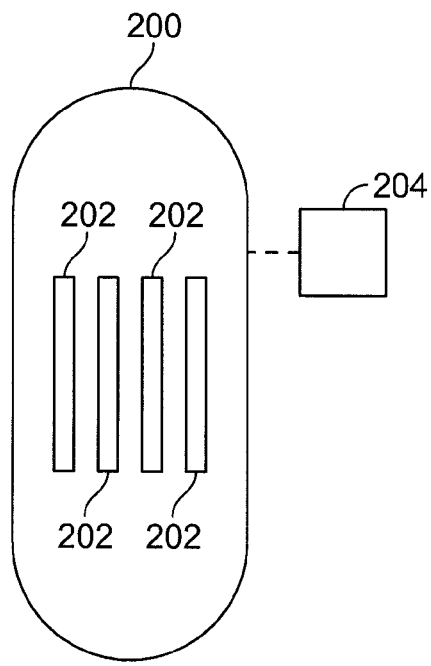
FIG. 7 schematically shows a nuclear reactor operated in accordance with an embodiment of the present invention.

FIG. 7 schematically shows a nuclear reactor 200 operated in accordance with an embodiment of the present invention. Nuclear reactor 200 includes a plurality of schematically shown fuel elements in its core. A controller 204 is provided for operating nuclear reactor 200 in accordance with a computer program product stored on a non-transitory computer readable media. The computer program product includes computer executable process steps operable to control controller 204 in accordance with the method described with respect to FIG. 4.

In the preceding specification, the invention has been described with reference to specific exemplary embodiments and examples thereof. It will, however, be evident that various modifications and changes may be made thereto without departing from the broader spirit and scope of invention as set forth in the claims that follow. The specification and drawings are accordingly to be regarded in an illustrative manner rather than a restrictive sense.

What is claimed is:

1. A method of operating a nuclear reactor comprising:
   determining a concentration of a noble metal substance in oxides on a heat transfer surface of the nuclear reactor, the oxides being in an oxide layer formed directly on a heat transfer surface and in a crud layer formed on the oxide layer;
   determining a value correlating to an amount of oxides on the heat transfer surface of the nuclear reactor as a function of the concentration of the noble metal substance in the oxides using an expression representing an inducement of corrosion by the noble metal substance;
   subsequent to the determination of the value correlating to the amount of oxides on the heat transfer surface, determining that the value correlating to the amount of oxides on the heat transfer surface has reached a predetermined value; and
   altering operation of the nuclear reactor in response to the value correlating to the amount of oxides on the heat transfer surface reaching the predetermined value,
   the value correlating to the amount of oxides on the heat transfer surface of the nuclear reactor being a thickness of the oxide layer and the crud layer,
   the determining the concentration of the noble metal substance in the oxides comprising:
      determining a first oxide noble metal concentration deposited directly on and within the oxide layer during a first time period;
      determining a first crud noble metal concentration captured in the crud layer during the first time period;
      determining a second oxide noble metal concentration deposited directly on and within the oxide layer during a second time period following the first time period, the second oxide noble metal concentration being a function of the first oxide noble metal concentration; and
      determining a second crud noble metal concentration captured in the crud layer during the second time period, the second crud noble metal concentration being a function of the first crud noble metal concentration,
      determining an oxide layer thickness of the oxide layer as a function of the second oxide noble metal concentration; and
      determining a crud layer thickness of the crud layer as a function of the second crud noble metal concentration,
   the determination that the thickness of the oxide layer and the crud layer has reached a predetermined value including determining that the oxide layer thickness plus the crud layer thickness has reached the predetermined value,
   the altering operation of the nuclear reactor in response to the thickness of the oxide layer and the crud layer reaching the predetermined value including altering operation of the nuclear reactor in response to the oxide layer thickness plus the crud layer thickness reaching the predetermined value.

2. The method as recited in claim 1 further comprising injecting the noble metal substance into the nuclear reactor.

3. The method as recited in claim 2 wherein the determining the value correlating to the amount of oxides on the heat transfer surface includes calculating a maximum peak noble metal substance loading on the heat transfer surface following the noble metal substance injection.

4. The method as recited in claim 1 wherein the heat transfer surface is on at least one fuel rod of the nuclear reactor, the determining the value correlating to the amount of oxides on the heat transfer surface including determining an axial distribution of the noble metal substance on the heat transfer surface of the at least one fuel rod.

5. The method as recited in claim 1 wherein the heat transfer surface is a nuclear fuel element surface.

6. The method as recited in claim 1 wherein the altering the operation of the nuclear reactor includes stopping the nuclear reactor.

7. The method as recited in claim 1 wherein the altering the operation of the nuclear reactor includes suppressing operation of a region of the nuclear reactor.

8. The method as recited in claim 3 wherein the maximum peak noble metal substance loading on the heat transfer surface is at a hottest nuclear fuel element in the nuclear reactor, the maximum peak noble metal substance loading being calculated using the following polynomial relationship:

$$c_{Pt}^{P} = A(c_{Pt}^{1})^2 + B(c_{Pt}^{1}) - C$$

where:
- $c_{Pt}^{P}$ is the maximum peak noble metal substance loading on heat transfer surfaces upon injection, μg/cm²;
- $c_{Pt}^{1}$ is a noble metal target injection loading on non-heated surfaces, μg/cm²; and
- A, B and C are the equation's coefficients.

9. The method as recited in claim 8 wherein the determining the first crud noble metal concentration captured in the crud layer during the first time period and the determining the first oxide noble metal concentration deposited directly on and within the oxide layer during the first time period are both performed based on plant observations regarding a ratio of noble metal distribution in the oxide layer and the crud layer using the following formula:

$$c_{Pt}^{P} = c_{Pt}^{Poxide} + c_{Pt}^{Pcrud}$$

where:
- $c_{Pt}^{P}$ is the maximum peak noble metal substance loading on heat transfer surfaces upon injection, μg/cm²;
- $c_{Pt}^{Poxide}$ is the maximum peak noble metal substance loading on heat transfer surfaces upon injection going directly to the oxide, μg/cm²; and
- $C_{Pt}^{Pcrud}$ is the maximum peak noble metal substance loading on fuel cladding upon injection going directly into crud on top of the fuel oxide, μg/cm².

10. The method as recited in claim 9 wherein the determining the second oxide noble metal concentration deposited directly on and within the oxide layer during the second time period following the first time period is performed using the following formula:

$$c_{Pt}^{Ox} = c_{Pt}^{O-BOC} e^{(g*dt)} \quad (10)$$

where:
- $c_{Pt}^{Ox}$ is the noble metal concentration in the oxide at given time and axial height;
- $c_{Pt}^{O-BOC}$ is the noble metal concentration at the oxide at the date of noble metal injection and the given axial height;
- g is a coefficient for noble metal incorporation into the oxide; and
- dt is the elapsed time since the date of noble metal injection.

11. The method as recited in claim 10 wherein the determining the second crud noble metal concentration captured in the crud layer during the second time period is performed using the following formula:

$$c_{Pt}^{Cx} = M c_{Pt}^{C(x-1)} \quad (9)$$

where:
- $c_{Pt}^{Cx}$ is the noble metal concentration in μg/cm² in the crud layer at the given time;
- $c_{Pt}^{C(x-1)}$ is the platinum noble metal concentration in μg/cm² in the crud layer at the prior time interval to the given time; and
- M is a release constant determined based on empirical data of flow erosion losses or coolant cleanup efficiency.

12. The method as recited in claim 11 wherein the determining an oxide layer thickness of the oxide layer as a function of the second oxide noble metal concentration is performed using the following formula:

$$d^{O}_{corr2} = d^{G}_{ox} + f_{Zr}(H d^{G}_{ox} + J(c_{Pt}^{Ox})^2 - K(c_{Pt}^{Ox})^2 + L c_{Pt}^{Ox})$$

where:
- $d^{O}_{corr2}$ is the oxide layer thickness of the oxide layer as a function of the second oxide noble metal concentration;
- $d^{G}_{ox}$ is the oxide thickness in micron conventionally predicted for the general corrosion of the heat transfer material;
- H is a height of a hottest point of a hottest fuel element;
- $f_{Zr}$ is a correction factor accounting for the lower oxygen dissociation rate of zirconium oxide; and
- J, K, and L are coefficients.

13. The method as recited in claim 12 wherein the determining a crud layer thickness of the crud layer as a function of the second crud noble metal concentration is performed using the following formula:

$$d^{C}_{corr2} = d^{G}_{ox} + H^{G}_{ox} + J(c_{Pt}^{Cx})^3 - K(c_{Pt}^{Cx})^2 + L c_{Pt}^{Cx}$$

where:
- $d^{C}_{corr2}$ is the crud layer thickness of the crud layer as a function of the second crud noble metal concentration.

* * * * *